United States Patent [19]
Emig et al.

[11] Patent Number: 5,085,489
[45] Date of Patent: Feb. 4, 1992

[54] ANTI-LOCK BRAKE CONTROL SYSTEM

[75] Inventors: Reiner Emig, Tamm; Werner Politz, Leonberg, both of Fed. Rep. of Germany

[73] Assignee: Robert Bosch GmbH, Stuttgart, Fed. Rep. of Germany

[21] Appl. No.: 573,027

[22] PCT Filed: Feb. 2, 1989

[86] PCT No.: PCT/EP89/00091
§ 371 Date: Aug. 28, 1990
§ 102(e) Date: Aug. 28, 1990

[87] PCT Pub. No.: WO89/08571
PCT Pub. Date: Sep. 21, 1989

[30] Foreign Application Priority Data
Mar. 16, 1988 [DE] Fed. Rep. of Germany ....... 3808724

[51] Int. Cl.$^5$ ............................................. B60T 8/38
[52] U.S. Cl. ...................................... 303/91; 303/100; 303/20

[58] Field of Search ................ 303/7, 100, 91, 20, 303/92; 188/112 A, 112 R

[56] References Cited

U.S. PATENT DOCUMENTS

| | | | |
|---|---|---|---|
| 3,169,595 | 2/1965 | Shepherd | 303/20 X |
| 3,507,541 | 4/1970 | Ayers, Jr. | 303/7 |
| 3,656,816 | 4/1972 | Schlitz et al. | 303/117 X |
| 3,897,979 | 8/1975 | Vangalis et al. | 188/112 A X |
| 3,955,652 | 5/1976 | Nilsson et al. | 303/20 X |
| 4,076,327 | 2/1978 | Hubbard | 303/7 X |
| 4,168,866 | 9/1979 | McNinch, Jr. et al. | 303/92 X |
| 4,856,850 | 8/1989 | Aichele et al. | 303/20 |

Primary Examiner—Robert J. Oberleitner
Assistant Examiner—Alfred Muratori
Attorney, Agent, or Firm—Felfe & Lynch

[57] ABSTRACT

An anti-lock brake control system for trailers is described where the power supply of the parts of the electronic system, which require only a small amount of electric power, is derived from the signals of the one (or several) speed sensor(s) and the power for the amplifier is supplied via the brake light line.

1 Claim, 1 Drawing Sheet

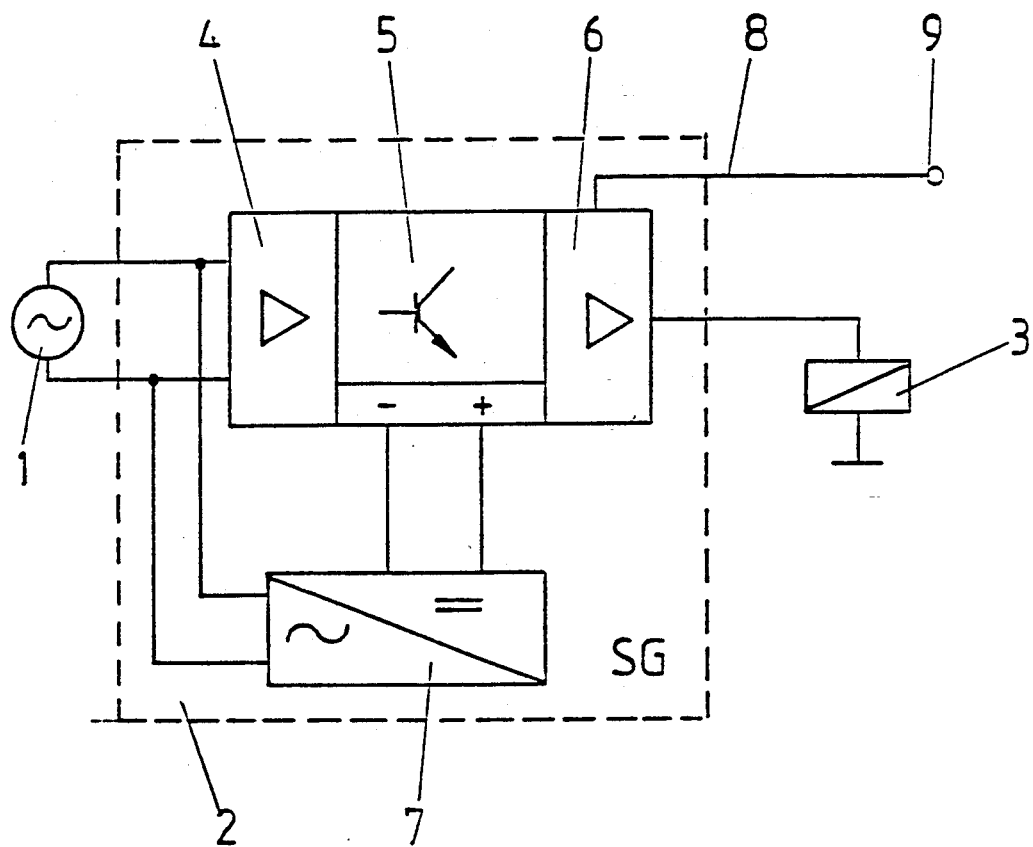

ANTI-LOCK BRAKE CONTROL SYSTEM

BACKGROUND OF THE INVENTION

The invention relates to an anti-lock brake control system for a full trailer or a semi-trailer having sensors for sensing the speeds of the wheels, an electronic control unit which generates brake pressure control signals from wheel speed signals generated by the sensors, an amplifier for amplifying the brake pressure control signals, and a brake pressure control unit containing solenoid valves to which the amplified control signals are supplied.

It is known to provide truck trains having ABS-equipped full or semi trailers with an extended plugging connection between tractor and trailer. This connection serves to connect the trailer to the power supply of the tractor.

SUMMARY OF THE INVENTION

According to the invention, power for the electronic control unit is provided exclusively from the signals generated by the sensors, and power for the amplifier is provided by the brake light line.

The configuration of the power supply of the trailer-ABS in accordance with the invention does not require a further connection between tractor and trailer. The use of the sensor signals to supply power to the electronics control ensures that the latter operates immediately with the beginning of travel of the truck train and is not activated only with the beginning of braking, which would be the case if the brake light signal activated the power supply of the entire system. This allows a more user-friendly design of the control. The increased power required for the amplifiers and the actuation of the solenoid valves, which cannot be derived from the sensor signals, is supplied via the brake light line. This is done such that sufficient time is available to ensure a response of the valves without delay when the control is activated. In addition to being independent of the onboard electric system, the invention is also independent of interferences thereof.

BRIEF DESCRIPTION OF THE DRAWING

The sole FIGURE is a schematic diagram of a trailer ABS.

DETAILED DESCRIPTION OF THE PREFERRED EMBODIMENT

The anti-lock brake control system includes a wheel speed sensor 1 (additional sensors may also be provided), a control device 2, and a solenoid valve 3 (additional valves may be provided). The method of operation of the control device 2 is known and need not be explained here in further detail. The control device 2 includes a preamplifier 4 for the signals of the sensors 1 and a control logic 5 where the control signals for the valves 3 are recovered from the supplied sensor signals; it further includes one or several power amplifiers 6, the output signals of which control the one or several solenoid valves 3.

The electronic control unit 4/5 requires only a minor amount of power, which is supplied by a power supply 7. The latter rectifies and smooths the sensor signals of the one or several sensors 1 and feeds these signals to the electronic control unit. This way of supplying power ensures that the electronic control unit 4/5 operates with the beginning of the travel. A digital wheel speed value and/or a reference value for slippage measurement is thus already present with the beginning of a braking action and the possibly immediately following control start. The one or several power amplifiers 6 are fed via brake light line 8 which is connected to the brake light line of the tractor via a terminal 9. Power is here supplied only with the beginning of braking.

We claim:

1. Anti-lock brake control system for a trailer having wheels which rotate at respective speeds and having a brake light line to which power is supplied during the braking of the wheels, said system comprising sensors for sensing the speeds of the wheels and generating wheel speed signals therefrom, an electronic control unit which generates brake pressure control signals from said wheel speed signals, said electronic control unit deriving power exclusively from the signals generated by the sensors, a power amplifier for amplifying the brake pressure control signals generated by the electronic control unit, the power for said amplifier being supplied via said brake light line, and a brake pressure control unit containing solenoid valves to which the amplified brake pressure control signals are supplied.

* * * * *